United States Patent Office.

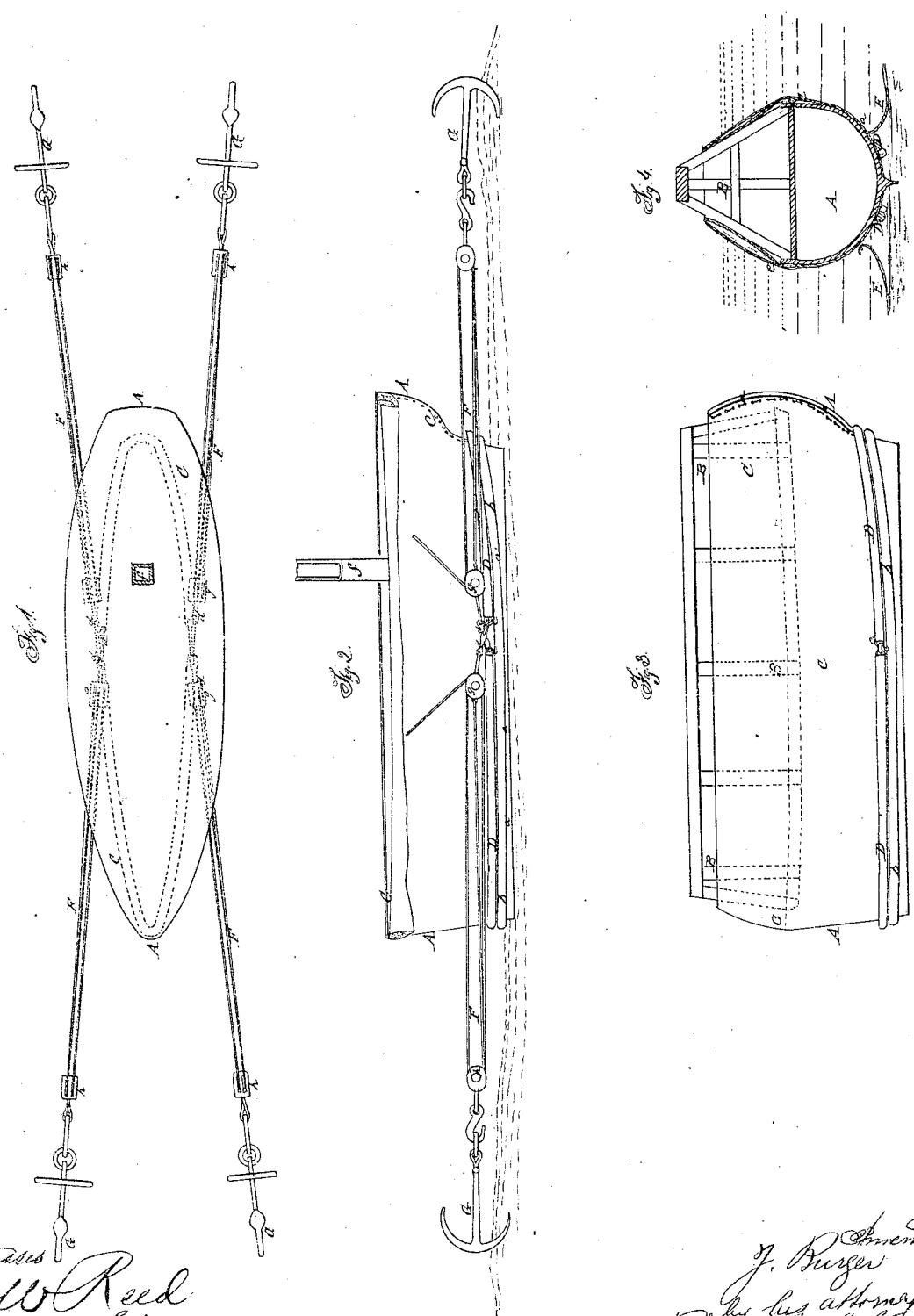

JOHN BURGER, OF ELIZABETHPORT, NEW JERSEY, ASSIGNOR TO HIMSELF AND ALBERT MANVIL, OF SAME PLACE.

Letters Patent No. 73,294, dated January 14, 1868; antedated January 4, 1868.

IMPROVED APPARATUS FOR RAISING SUNKEN VESSELS.

The Schedule referred to in these Letters Patent and making part of the same.

TO ALL WHOM IT MAY CONCERN:

Be it known that I, JOHN BURGER, of Elizabethport, in the county of Union, and State of New Jersey, have invented certain new and useful Improvements in Apparatus for Raising Sunken Vessels; and I do hereby declare that the following is a full, clear, and exact description of the same, reference being had to the accompanying drawings, making a portion of this specification, in which—

Figure 1 is a plan view, representing my apparatus as applied in raising a sunken vessel.

Figure 2 is a side view and partial section of the same.

Figure 3 is a side view of the same as constructed and employed in raising vessels in water of less depth than when made as shown in figs. 1 and 2.

Figure 4 is a transverse vertical section of the same.

Similar letters of reference indicate corresponding parts in all the figures.

This invention consists in an envelope, of canvas or other like material, so constructed and combined with a suitable binding-cable, that the said envelope may be made to surround the hull of the vessel to be raised, in such manner as to exclude the external water therefrom, and permit the water contained therein to be readily pumped out, as required in raising the said hull.

The invention further consists in the construction of the said binding-cable in two or more sections, composed of India rubber, or equivalent elastic material, whereby not only may the aforesaid envelope be more readily secured upon the hull, but also held closer thereto than if an ordinary cable were employed, thereby securing the most efficient action of the envelope in excluding the water therefrom.

The invention further consists in a frame designed for use when the vessel is sunk in comparatively shallow water, so arranged upon the hull of the vessel, and in relation with the envelope just mentioned, as to greatly facilitate, under such circumstances, the removal of the water from the aforesaid hull.

The invention further consists in a supplemental canvas sheet or wing, so arranged at the lower edge of the envelope, that when the vessel is raised, a leak therein below the aforesaid envelope will be temporarily closed by the said wing.

The invention further consists in a novel arrangement of anchors, pulleys, and straining-cables, whereby the binding-cable is strained tightly around the hull, to hold the envelope in place thereon.

To enable others to understand the nature and construction of my invention, I will proceed to describe it with reference to the drawings.

The hull of the vessel is shown at A, and of course, when foundered or sunken, has its bottom more or less embedded in the bank to which it descends. Inasmuch as the construction of the apparatus, when used upon vessels sunk but a little distance below the surface of the water, differs somewhat from that employed when the vessel lies at a greater depth, I will, for greater convenience of description, first explain my invention as constructed and employed in raising vessels in shallow water, reference being had more especially, in this connection, to figs. 3 and 4.

Placed upon the hull is a wooden or other strong skeleton frame, B, which extends up above the surface of the water. Passed around the hull, with its lower edge close to the bank upon which the said hull rests, and with its upper edge extending nearly to the top of the frame B, is an envelope, C, which may be made of a continuous piece of canvas, the two ends of which, brought together at one end of the hull, are furnished with rolls a, of cotton or like material, so that the said rolls a, being tightly stitched together, form a comparatively water-tight joint. The lowermost edge of the aforesaid envelope is furnished with a similar roll, b, above which, and passing around the hull, is a strong binding-cable, D, which is made of India rubber or like elastic material, and in two sections, furnished at their ends with suitable rings c, the said ends being laced or bound together at the sides of the vessel, as indicated at e in fig. 3. In case a leak exists in the hull, below the envelope, a supplemental sheet or wing, E, of canvas, has one of its longitudinal edges laced to eyelets $a'$, at the lower edge of the envelope, as represented in fig. 4. The parts just described being thus arranged, the water is pumped from the interior of the hull, which, being emptied, rises either by its own buoyancy or by the assistance of suitable lifting-devices; and in case of a leak in the bottom thereof, as just mentioned, the external pressure of the water upon the sheet or wing E, as the hull is raised, forces the same inward against the side of the said hull, so as to cover the leak, and thus temporarily but effectually close the same.

When the vessel is situated at a considerable depth, the frame B is dispensed with, and the envelope is formed to extend over the top of the hull, as shown in figs. 1 and 2; and, passing through the same, into the interior of the hull, is a pipe, $f$, through which the water is drawn from the said hull by a pump, of any suitable kind, whereupon the hull is raised, as in the case first herein described, either by its own buoyancy alone, or assisted by appropriate lifting-machinery, the sheet or wing E being employed in this instance, as in the other, in case it is required to stop a leak not covered by the envelope.

In securing the binding-cable D around the hull to confine the lower edge of the envelope thereto, as hereinbefore explained, each of the ends of the sections thereof has hooked into its ring $c$ a hook, $d$, by means of which it is connected with the pulley $g$ of a tackle, of which the straining-cable or rope is marked F, and the remaining pulley, $h$. This pulley $h$, last mentioned, is attached to an anchor, G, firmly secured in the bank upon which the vessel rests, in such manner that the portion of the straining-cable between the two pulleys $g\ h$ is in a nearly or quite horizontal position, and about longitudinal with reference to the hull of the vessel. The four tackles being thus attached to the four ends of the two sections of the elastic binding-cable, as indicated more fully in fig. 1, the free or outer ends of the straining-cables F thereof are carried upward to suitable vessels at the surface of the water, and power is applied thereto to draw together the adjacent ends of the two sections of the binding-cable D, which, being done, the rings $c$ at the said ends are lashed together, as shown at $e$, by a diver, and the binding-cable is thus secured in place, the roll $b$, at the bottom of the envelope C, preventing the binding-cable from slipping from the same, and the tightening of the said cable causing the same to slip upon the sloping sides of the hull, down close to the bank upon which the latter rests, thus causing the envelope to completely cover such portions of the sides of the hull as may be situated above such bank.

What I claim as my invention, and desire to secure by Letters Patent, is—

1. The envelope C, constructed and applied to the hull of a vessel, substantially as described, in combination with a suitable binding-cable, substantially as and for the purpose specified.

2. The construction of the binding-cable D, in two or more sections, of India rubber or like elastic material, substantially as and for the purpose specified.

3. The frame B, arranged upon the hull of the vessel, and in combination with the envelope C, surrounding the same, substantially as and for the purpose specified.

4. The supplemental sheet or wing E, arranged in relation with the envelope C and the hull of the vessel, substantially as and for the purpose specified.

5. The anchors G, straining-cables F, and pulleys $h$, arranged in relation with each other, and with the hull of the vessel, the envelope C, and binding-cable, substantially as and for the purpose specified.

JOHN BURGER.

Witnesses:
GEO. H. ROPES,
WATERS FURMAN.